United States Patent
Wang et al.

(10) Patent No.: US 11,336,711 B2
(45) Date of Patent: May 17, 2022

(54) METHOD OF PLAYING AUDIO AND VIDEO, COMPUTING DEVICE, AND COMPUTER PROGRAM PRODUCT

(71) Applicant: Shanghai Bilibili Technology Co., Ltd., Shanghai (CN)

(72) Inventors: Sheng Wang, Shanghai (CN); Hanchao Zheng, Shanghai (CN); Zhiqiang Wu, Shanghai (CN); Hui Chen, Shanghai (CN); Jianqiang Ding, Shanghai (CN); Wenjie Fan, Shanghai (CN); Zhaoxin Tan, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/304,774

(22) Filed: Jun. 25, 2021

(65) Prior Publication Data
US 2021/0352127 A1    Nov. 11, 2021

Related U.S. Application Data

(63) Continuation of application No. PCT/CN2019/128439, filed on Dec. 25, 2019.

(30) Foreign Application Priority Data

Jan. 30, 2019 (CN) .................. 201910092692.X

(51) Int. Cl.
*H04L 65/60* (2022.01)
*H04L 65/612* (2022.01)
*H04N 21/2662* (2011.01)

(52) U.S. Cl.
CPC ........ *H04L 65/607* (2013.01); *H04L 65/4084* (2013.01); *H04L 65/601* (2013.01); *H04N 21/2662* (2013.01)

(58) Field of Classification Search
CPC . H04L 65/607; H04L 65/4084; H04L 65/601; H04N 21/2662
See application file for complete search history.

(56) References Cited

U.S. PATENT DOCUMENTS

2004/0227703 A1* 11/2004 Lamvik ................ G09G 3/3233
                                                                    345/76
2016/0182593 A1    6/2016 Denoual et al.
(Continued)

FOREIGN PATENT DOCUMENTS

CN      102647634 A     8/2012
CN      103905924 A     7/2014
(Continued)

OTHER PUBLICATIONS

The International Search Report (translated version) for related application, PCT/CN2019/128439, dated Mar. 10, 2020, 2 pages.
(Continued)

*Primary Examiner* — Oanh Duong
(74) *Attorney, Agent, or Firm* — Kilpatrick Townsend & Stockton LLP

(57) ABSTRACT

A method of playing audio and video is provided. The method includes: obtaining a streaming media content to be encapsulated, and parsing the streaming media content to obtain audio parameter information and/or video parameter information; forming a Media Presentation Description (MPD) file in JavaScript Object Notation (JSON) format according to the audio parameter information and/or the video parameter information, wherein the MPD file in JSON format includes multiple streaming media content segments, each streaming media content segment includes a video segment and/or an audio segment, each of the video segment and the audio segment includes multiple arrays, and each array includes the audio parameter information or the video
(Continued)

parameter information; sending the MPD file in JSON format to a client.

20 Claims, 5 Drawing Sheets

(56) References Cited

U.S. PATENT DOCUMENTS

| | | | |
|---|---|---|---|
| 2017/0041363 A1* | 2/2017 | Thompson | G06F 16/4387 |
| 2018/0069981 A1* | 3/2018 | Pekarske | H04N 1/00344 |
| 2018/0109577 A1* | 4/2018 | Deshpande | H04L 69/22 |
| 2018/0359513 A1* | 12/2018 | Deshpande | H04N 21/812 |
| 2018/0359541 A1* | 12/2018 | Park | G06F 9/54 |
| 2019/0014358 A1* | 1/2019 | Takabayashi | H04N 21/64322 |
| 2019/0149857 A1* | 5/2019 | Lo | H04N 21/43074 709/219 |

FOREIGN PATENT DOCUMENTS

| | | |
|---|---|---|
| CN | 104270646 A | 1/2015 |
| CN | 107835150 A | 3/2018 |
| CN | 108924606 A | 11/2018 |

OTHER PUBLICATIONS

Brandonocasey: "mpd-parser/README.md", videojs/mpd-parser, Aug. 29, 2018 (Aug. 29, 2018), XP055879197.
Extended European Search Report for EP Application No. 19913045.1, dated Jan. 26, 2022, 5 pages, Jan. 26, 2022.
Forbesjo: "mpd-parser/maat_vtt_segmentTemplate.js", videojs/mpd-parser, Mar. 30, 2018 (Mar. 30, 2018), XP055879344.
Tatsuya Igarashi et al.: "DASH sub-frame format of WebSocket", 110. MPEG Meeting; Oct. 20, 2014-Oct. 24, 2014; Strasbourg; (Motion Picture Expert Group or ISO/IEC JTC1/SC29/WG11), No. m34631 Sep. 19, 2014 (Sep. 19, 2014), XP030063003.

* cited by examiner

— 1 —

METHOD OF PLAYING AUDIO AND VIDEO, COMPUTING DEVICE, AND COMPUTER PROGRAM PRODUCT

CROSS-REFERENCE TO RELATED APPLICATIONS

The present application is a continuation under 35 U.S.C. 111(a) of PCT International Application No. PCT/CN2019/128439, filed on Dec. 25, 2019, which claims priority to Chinese patent application No. 201910092692.X filed on Jan. 30, 2019, the entire contents of which are hereby incorporated by reference in their entirety for all purposes.

TECHNICAL FIELD

The present application relates to a field of audio and video playing technologies, and more particularly to a method of playing audio and video, a computing device, and a computer-program product.

BACKGROUND

In order to make audio and video play more smoothly, more and more video websites have begun to use DASH (Dynamic Adaptive Streaming over HTTP) technology, the DASH is an adaptive bitrate streaming technology that enables high-quality streaming media to be delivered over the Internet through a traditional HTTP web server; the DASH splits a streaming media content into multiple segments, each segment contains a playable content of a certain length (for example, 10 seconds), and each segment corresponds to multiple resolutions (for example, 1080P, 720P, 480P, 360P) or multiple bitstreams are available, and a client can choose to download and play the segments with a specified resolution or a segment of a bitstream according to current network conditions. Compared with the traditional technology of playing audio and video, it does not need to reload a player when switching a resolution, which can guarantee the fluency of playing.

SUMMARY

One aspect of the present application provides a method, including:

obtaining a streaming media content to be encapsulated, and parsing the streaming media content to obtain audio parameter information and/or video parameter information;

forming a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes the audio parameter information or the video parameter information; and sending the MPD file in JSON format to a client.

Another aspect of the present application provides a computing device, including: one or more processors; one or more non-transitory computer-readable storage mediums containing instructions configured to cause the one or more processors to perform operations including:

obtaining a streaming media content to be encapsulated, and parsing the streaming media content to obtain audio parameter information and/or video parameter information;

forming a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes audio parameter information or video parameter information; and sending the MPD file in JSON format to a client.

The present application further provides a non-transitory computer-program product tangibly embodied in a machine-readable non-transitory storage medium that includes instructions configured to cause one or more processors to:

obtain a streaming media content to be encapsulated, and parsing the streaming media content to obtain audio parameter information and/or video parameter information;

form a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes audio parameter information or video parameter information; and send the MPD file in JSON format to a client.

BRIEF DESCRIPTION OF THE DRAWINGS

Various other advantages and benefits will become apparent to those of ordinary skill in the art upon reading the detailed description of some embodiments below. The drawings are only for the purpose of illustrating some embodiments and are not to be considered as limiting the present application. Moreover, the same reference numerals are used throughout the drawings to refer to the same parts. In the drawings.

DETAILED DESCRIPTION OF ILLUSTRATIVE EMBODIMENTS

To make the purposes, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on some embodiments of the present application without creative efforts shall fall within the protection scope of the present application.

When using the DASH technology to play the audio and video, a server needs to send an MPD (Media Presentation Description) file to the client; the MPD file is a file to describe the streaming media, including segmentation information, available resolution and bitstream information, and the client can selectively download video with the specified resolution and/or audio of the specified bitstream according to the MPD file to play. However, the inventor found that, at present, the MPD file specified in DASH protocol is a file in XML (Extensible Markup Language) format, which has more redundant information, larger file volume, and poor extensibility.

According to some embodiments, a method of playing audio and video provided in the present application is described with reference to drawings as following.

Figure 1:
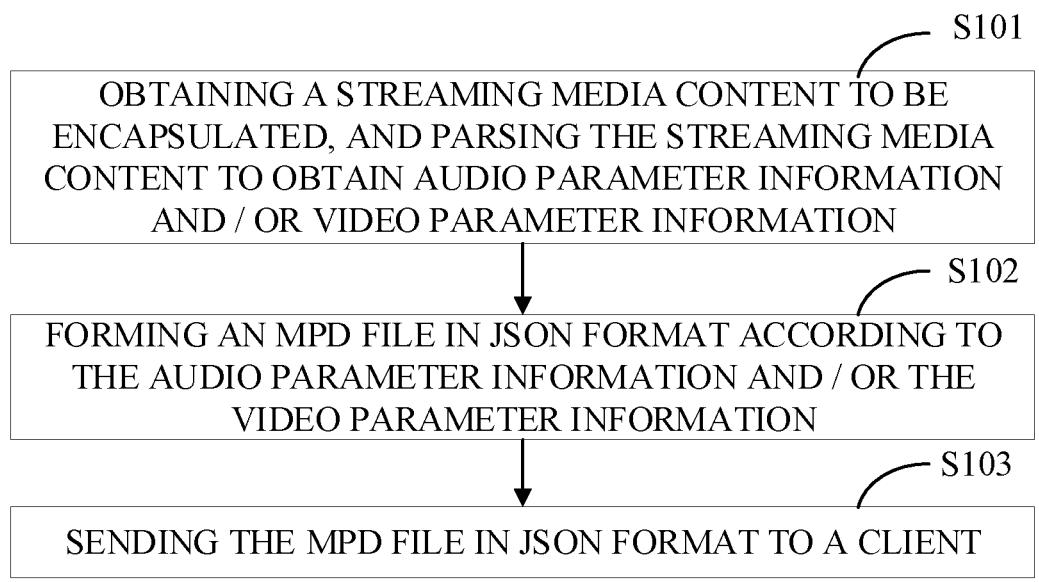
FIG. 1 illustrates a flowchart of a method of playing audio and video according to some embodiments of the present application.

FIG. 1 illustrates an optional flowchart of a method of playing audio and video of the present application, and the method is applied to a server, as shown in FIG. 1, the method may include the following steps.

Step S101, obtaining a streaming media content to be encapsulated, and parsing the streaming media content to obtain audio parameter information and/or video parameter information.

According to some embodiments, the audio parameter information includes: bitstream information, audio address information for respective bitstreams, and audio attribute information for respective bitstreams.

The audio address information includes: audio primary address information and audio backup address information.

The audio attribute information includes: audio stream identification number (ID), bandwidth recommended for audio transmission (Bandwidth), media type (mineType), encoding method (codecs), whether the audio is initialized (Initialization), current audio segment index range (indexRange), audio encoding identification number (cidecid).

The video parameter information includes: resolution information, video address information for respective resolutions, and video attribute information for respective resolutions.

The video address information includes: video primary address information and video backup address information.

The video attribute information includes: video stream identification number (ID), bandwidth recommended for video transmission (Bandwidth), media type (mineType), encoding method (codecs), width, height, framerate, video SAR ratio (sar), video SAP start value, startWithSAP, whether the video is initialized (Initialization), current video segment index range (indexRange), video encoding identification number (cidecid). Step 102: forming an MPD file in JSON format according to the audio parameter information and/or the video parameter information.

According to some embodiments, the MPD file is a description file of video, which can be used to describe the composition of the whole MPEG DASH (also known as DASH) bitstream, and it is equivalent to M3U8 (M3U8 is a format of video) file of HLS (HTTP live streaming) protocol, the MPD file is an XML (Extensible Markup Language) Document (Document is a computer term, and each HTML (Hyper Text Markup Language) document loaded into the browser will become a Document object), and the content of the MPD file can construct a URL (Uniform Resource Locator) downloaded for HTTP GET request (HTTP GET request is a way of HTTP requests).

Figure 2:
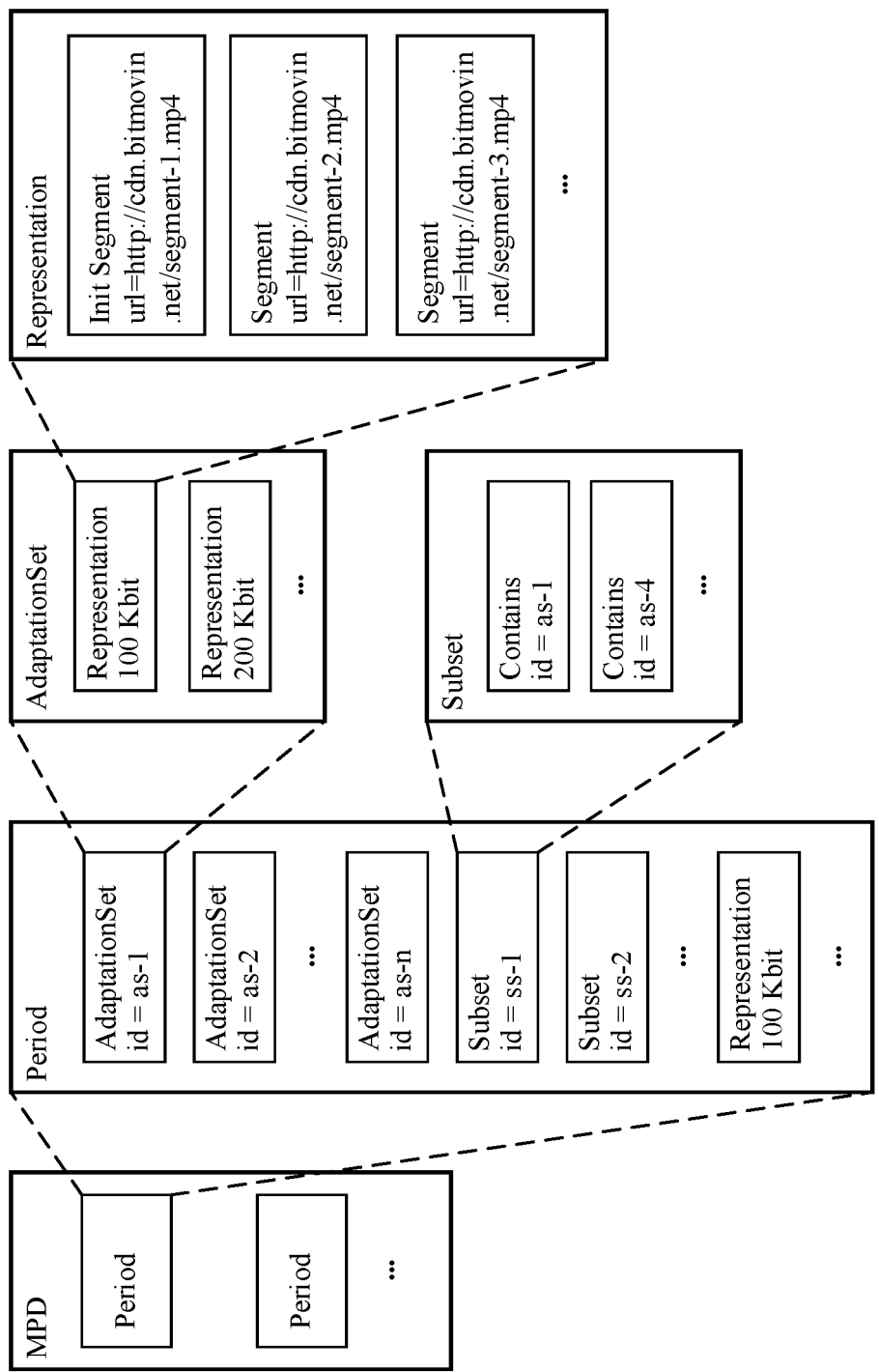
FIG. 2 illustrates a content structure diagram of an MPD file in XML format according to some embodiments of the present application.

FIG. 2 illustrates a schematic diagram of content structure of the MPD file in XML format, the MPD file in XML format includes multiple fragment Period files, and each of the Period files has a corresponding application description (AdaptationSet) file; a resolution description (Representation) file of different resolutions/bitstreams is contained in one AdaptationSet file, each Representation file corresponds to a resolution/bitrate, and each Representation file contains attribute information of corresponding to the resolution/bitrate; a plurality of segments is contained in a Representation file, and each segment corresponds to a video content or audio content with a certain length of time.

In the MPD file in XML format, a streaming media content is put into a Period segment; and video data and audio data in the streaming media content are stored in different AdaptSetSet segments; videos of different resolutions are represented by different representation segments, and audios of different bitstreams are also represented by different Representation segments; video attribute information or audio attribute information is contained in a Representation segment.

For example, codes of the MPD file in XML format are as follows:

```
<?xml version="1.0"?>
<!-- MPD file Generated with Bilibili Corp on 2018-12-25T07:44:04Z-->
<MPD xmlns="urn:mpeg:dash:schema:mpd:2011" minBufferTime="PT1.500000S"
type="static" mediaPresentationDuration="PT0H5M25.00S"
profiles="urn:mpeg:dash:profile:isoff-on-demand:2011">
    <Period duration="PT0H5M25.00S">
        <AdaptationSet segmentAlignment="true" maxWidth="1920" maxHeight="1080"
maxFrameRate="30" par="852:480" subsegmentStartsWithSAP="1">
            <Representation id="32" mimeType="video/mp4" codecs="avc1.64001F"
width="852" height="480" frameRate="16000/528" sar="640:639" startWithSAP="1"
bandwidth="922085">
                <BaseURL
backupUrl1="http://cn-zjwz3-dx-v-02.acgvideo.com/upgcxcode/00/05/66810500/66810500-1-30
032.m4s"
backupUrl2="http://cn-zjjh5-dx-v-06.acgvideo.com/upgcxcode/00/05/66810500/66810500-1-30
032.m4s">http://cn-jszj-dx-v-07.acgvideo.com/upgcxcode/00/05/66810500/66810500-1-30032.
m4s</BaseURL>
                <SegmentBase Initialization="0-1008" indexRange="1009-1820"/>
            </Representation>
            <Representation id="64" mimeType="video/mp4" codecs="avc1.64001F"
width="1280" height="720" frameRate="16000/528" sar="1:1" startWithSAP="1"
bandwidth="2047546">
                <BaseURL
```

-continued

```
backupUrl1="http://cn-jszj-dx-v-06.acgvideo.com/upgcxcode/00/05/66810500/66810500-1-30064.m4s"
backupUrl2="http://cn-zjwz3-dx-v-10.acgvideo.com/upgcxcode/00/05/66810500/66810500-1-30064. m4s">http://cn-zjwz4-dx-v-03.acgvideo.com/upgcxcode/00/05/66810500/66810500-1-30064.m4s</BaseURL>
        <SegmentBase Initialization="0-1004" indexRange="1005-1816"/>
      </Representation>
    </AdaptationSet>
    <AdaptationSet segmentAlignment="true"subsegmentStartsWithSAP="1">
      <Representation id="30280" mimeType="audio/mp4" codecs="mp4a.40.2" audioSamplingRate="44100" startWithSAP="1" bandwidth="252667">
        <AudioChannelConfiguration schemeIdUri="urn:mpeg:dash:23003:3:audio_channel_configuration:2011"value="2"/>
        <BaseURL
backupUrl1="http://cn-zjwz3-dx-v-03.acgvideo.com/upgcxcode/00/05/66810500/66810500-1-30280.m4s"
backupUrl2="http://cn-zjjh5-dx-v-06.acgvideo.com/upgcxcode/00/05/66810500/66810500-1-30280.m4s">http://cn-jszj-dx-v-11.acgvideo.com/upgcxcode/00/05/66810500/66810500-1-30280.m4s</BaseURL>
        <SegmentBase Initialization="0-907" indexRange="908-1731"/>
      </Representation>
    </AdaptationSet>
    <Representation id="30216" mimeType="audio/mp4" codecs="mp4a.40.2" audioSamplingRate="44100" startWithSAP="1" bandwidth="67271">
        <AudioChannelConfiguration schemeIdUri="urn:mpeg:dash:23003:3:audio_channel_configuration:2011"value="2"/>
        <BaseURL
backupUrl1="http://cn-jszj-dx-v-08.acgvideo.com/upgcxcode/00/05/66810500/66810500-1-30216.m4s"
backupUrl2="http://cn-zjwz3-dx-v-08.acgvideo.com/upgcxcode/00/05/66810500/66810500-1-30216.m4s">http://cn-zjwz4-dx-v-04.acgvideo.com/upgcxcode/00/05/66810500/66810500-1-30216.m4s</BaseURL>
        <SegmentBase Initialization="0-907" indexRange="908-1731"/>
      </Representation>
    </AdaptationSet>
  </Period>
</MPD>
```

It can be seen that the content of the MPD file in XML format is too large and not clear enough, which causes volume of the MPD file to be too large.

According to some embodiments, the MPD file is encapsulated in JSON format, where the MPD file in JSON format includes multiple streaming media content segments, each streaming media content segment includes a video segment and/or an audio segment, each of the video segment and the audio segment includes multiple arrays, and each array includes audio parameter information or video parameter information.

According to some embodiments, the streaming media content segment corresponds to the Period segment in the MPD file in XML format, the video segment corresponds to the AdaptationSet segment of the video in the MPD file in XML format, the audio segment corresponds to the AdaptationSet segment of the audio in the MPD file in XML format, and the array corresponds to the Representation segment in the MPD file in XML format.

According to some embodiments, in practical applications, a dash { } segment is used to represent the streaming media content segment, a video [ ] segment is used to represent the video segment, an audio [ ] segment is used to represent the audio segment, and a { } is used to represent the array in the video [ ] segment and the audio [ ] segment.

According to some embodiments, the Period segment in the MPD file in XML format is converted to a dash segment, the AdaptationSet segment of the video in the MPD file in XML format is converted to the video segment, and the AdaptationSet segment of the audio in the MPD file in XML format is converted to the audio segment. An array { } of the JSON is used to represent the representation segment of the video in the MPD file in XML format, and the video parameter information and audio parameter information is added to the array { }.

For example, the code of the MPD file in JSON format is as follows:

```
{
    "dash": {
        "duration": 325,
        "minBufferTime": 1.5,
        "video": [
            {
                "id": 32,
                "baseUrl":
"http://cn-jszj-dx-v-07.acgvideo.com/upgcxcode/00/05/66810500/66810500-1-30032.m4s",
                "backupUrl": [
"http://cn-zjwz3-dx-v-02.acgvideo.com/upgcxcode/00/05/66810500/66810500-1-30032.m4s",
"http://cn-zjjh5-dx-v-06.acgvideo.com/upgcxcode/00/05/66810500/66810500-1-30032.m4s"
                ],
                "bandwidth": 922085,
```

```
                "mimeType": "video/mp4",
                "codecs": "avc1.64001F",
                "width": 852,
                "height": 480,
                "frameRate": "16000/528",
                "sar": "640:639",
                "startWithSAP": 1,
                "SegmentBase": {
                    "Initialization": "0-1008",
                    "indexRange": "1009-1820"
                },
                "codecid": 7
            },
            {
                "id": 64,
                "baseUrl": "http://cn-zjwz4-dx-v-03.acgvideo.com/upgcxcode/00/05/66810500/66810500-1-30064.m4s",
                "backupUrl": [
                    "http://cn-jszj-dx-v-06.acgvideo.com/upgcxcode/00/05/66810500/66810500-1-30064.m4s",
                    "http://cn-zjwz3-dx-v-10.acgvideo.com/upgcxcode/00/05/66810500/66810500-1-30064.m4s"
                ],
                "bandwidth": 2047546,
                "mimeType": "video/mp4",
                "codecs": "avc1.64001F",
                "width": 1280,
                "height": 720,
                "frameRate": "16000/528",
                "sar": "1:1",
                "startWithSAP": 1,
                "SegmentBase": {
                    "Initialization": "0-1004",
                    "indexRange": "1005-1816"
                },
                "codecid": 7
            },
        ],
        "audio": [
            {
                "id": 30280,
                "baseUrl": "http://cn-jszj-dx-v-11.acgvideo.com/upgcxcode/00/05/66810500/66810500-1-30280.m4s",
                "backupUrl": [
                    "http://cn-zjwz3-dx-v-03.acgvideo.com/upgcxcode/00/05/66810500/66810500-1-30280.m4s",
                    "http://cn-zjjh5-dx-v-06.acgvideo.com/upgcxcode/00/05/66810500/66810500-1-30280.m4s"
                ],
                "bandwidth": 252667,
                "mimeType": "audio/mp4",
                "codecs": "mp4a.40.2",
                "SegmentBase": {
                    "Initialization": "0-907",
                    "indexRange": "908-1731"
                }
            },
            {
                "id": 30216,
                "baseUrl": "http://cn-zjwz4-dx-v-04.acgvideo.com/upgcxcode/00/05/66810500/66810500-1-30216.m4s",
                "backupUrl": [
                    "http://cn-jszj-dx-v-08.acgvideo.com/upgcxcode/00/05/66810500/66810500-1-30216.m4s",
                    "http://cn-zjwz3-dx-v-08.acgvideo.com/upgcxcode/00/05/66810500/66810500-1-30216.m4s"
                ],
                "bandwidth": 67271,
                "mimeType": "audio/mp4",
                "codecs": "mp4a.40.2",
                "SegmentBase": {
"Initialization": "0-907",
"indexRange": "908-1731"
                }
            }
        ]
    }
}
```

It can be seen that by using the JSON format, the content of the MPD file is more concise and clear, thereby the volume of the MPD file is reduced.

According to some embodiments, the step S102 specifically includes:

Step A1: adding video parameter information for a same resolution to a respective array, and/or adding audio parameter information for a same bitstream to an array;

Step A2: adding respective arrays for respective resolutions to a video segment, and/or adding respective arrays for respective bitstreams to an audio segment; and Step A3: adding the video segment and/or the audio segment to a streaming media content.

When constructing the MPD file in JSON format, the array is constructed based on the video parameter information and the audio parameter information firstly, then the video segment is constructed based on the video array and the audio segment is constructed based on the audio array, and the streaming media content segment is constructed based on the video segment and audio segment finally.

Step 103: sending the MPD file in JSON format to the client.

According to some embodiments, a method of playing audio and video provided in the present application will be described with reference to drawings as following.

Figure 3:
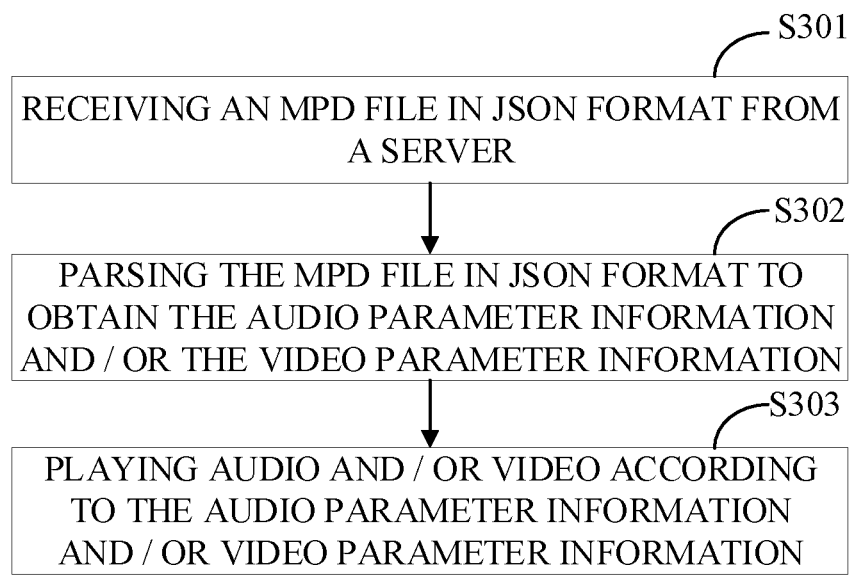
FIG. 3 illustrates a flowchart of a method of playing audio and video according to some embodiments of the present application.

FIG. 3 illustrates an optional flowchart of a method of playing audio and video of the present application, and the method is applied to a client. As shown in FIG. 3, the method may include the following steps.

Step 301: receiving an MPD file in JSON format from a server.

The MPD file in JSON format includes multiple streaming media content segments, each streaming media content segment includes a video segment and/or an audio segment, each of the video segment and audio segment includes multiple arrays, and each array includes audio parameter information or video parameter information.

Step 302: parsing the MPD file in JSON format to obtain the audio parameter information and/or the video parameter information.

According to some embodiments, the step S302 includes:

step B1: parsing out streaming media content segments contained in the JSON format MPD file;

step B2: parsing out video segments and/or audio segments contained in the streaming media content segments;

step B3: parsing out arrays for respective resolutions contained in the video segments, and/or parsing out arrays for respective bitstreams contained in the audio segments; and step B4: parsing out video parameter information of a corresponding resolution and/or audio parameter information of a corresponding bitstream contained in the arrays.

According to some embodiments, since the JSON format is used to encapsulate the MPD file, the client also needs to parse the MPD file in JSON format to obtain tree structure data and each attribute parameter as shown in FIG. 2.

According to the introduction in some embodiments, in practical applications, a dash { } segment is used to represent the streaming media content segment, a video [ ] segment is used to represent the video segment, an audio [ ] segment is used to represent the audio segment, and a { } is used to represent the array in the video [ ] segment and the audio [ ] segment; therefore, the step 302 specifically includes:

parsing out the dash { } segment contained in the MPD file in JSON format, where one dash { } segment corresponds to one playable streaming media content;

parsing out the video [ ] segment and/or the audio [ ] segment contained in the dash { } segment where the video [ ] segment corresponds to video content of the streaming media content, and the audio [ ] segment corresponds to audio content of the streaming media content;

parsing out the { } contained in the video [ ] segment and/or the audio [ ] segment where each { } of the video [ ] segment corresponds to different resolutions, each { } of the audio [ ] segment corresponds to different bitstream;

parsing out the video parameter information or the audio parameter information contained in the { }.

According to some embodiments, the audio parameter information includes: bitstream information, audio address information for respective bitstreams, and audio attribute information for respective bitstreams.

The audio address information includes: audio primary address information and audio backup address information.

The audio attribute information includes: audio stream identification number (ID), recommended audio transmission bandwidth (Bandwidth), media type (mineType), encoding method (codecs), whether the audio is initialized (Initialization), current audio segment index range (indexRange), audio encoding identification number (cidecid).

The video parameter information includes: resolution information, video address information for respective resolutions, and video attribute information for respective resolutions.

The video address information includes: video primary address information and video backup address information.

The video address information includes: video stream identification number (ID), recommended video transmission bandwidth (Bandwidth), media type (mineType), encoding method (codecs), width, height, framerate, video SAR ratio (sar), video SAP start value, startWithSAP, whether the video is initialized (Initialization), current video segment index range (indexRange), video encoding identification number (cidecid).

Step 303: playing audio and/or video according to the audio parameter information and/or video parameter information.

Since in the prior art, before playing the audio and video with the MPD file in XML format, the audio parameter information and the video parameter information of the MPD file in XML format are parsed firstly, then the audio and video is played according to the audio parameter information and the video parameter information. Therefore, the step 303 can use the existing audio and video play mode, and it will not be described in detail here.

Figure 4:
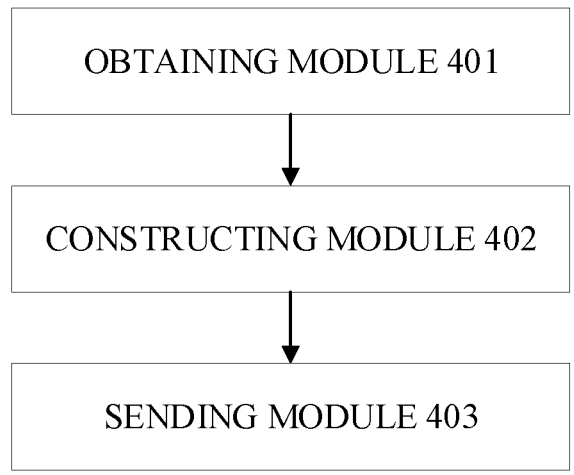
FIG. 4 illustrates a schematic structural diagram of a device of playing audio and video according to some embodiments the present application.

Based on the method for audio and video playing provided in some embodiments, a device of playing audio and video is provided according to some embodiments. According to some embodiments, FIG. 4 illustrates an optional block diagram of the audio and video playing device. The audio and video playing device may be divided into one or more program modules, which are stored in a medium and executable by one or more processors to implement some embodiments of the present application. The program module referred to in some embodiments of the present application refers to a series of computer program instruction segments capable of accomplishing specific functions, and is more suitable, as compared to the program per se, for describing the implementation in the storage medium of the device of playing audio and video. The following description will specifically describe the functions of the program modules according to some embodiments.

As shown in FIG. 4, the audio and video playing device applied to servers includes the following components:

an obtaining module 401 for obtaining a streaming media content to be encapsulated, and parsing the streaming media content to obtain audio parameter information and/or video parameter information.

According to some embodiments, the audio parameter information includes: bitstream information, audio address information for respective bitstreams, and audio attribute information for respective bitstreams.

The video parameter information includes: resolution information, video address information for respective resolutions, and video attribute information for respective resolutions.

A constructing module 402 for forming a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes audio parameter information or video parameter information.

According to some embodiments, the constructing module 402 is configured to:

add video parameter information for a same resolution to an array, and/or add audio parameter information for a same bitstream to an array; add respective arrays for respective resolutions to a video segment, and/or add respective arrays for respective bitstreams to an audio segment; and add the video segment and/or the audio segment to a streaming media content.

A sending module 403 is configured to send the MPD file in JSON format to a client.

Figure 5:
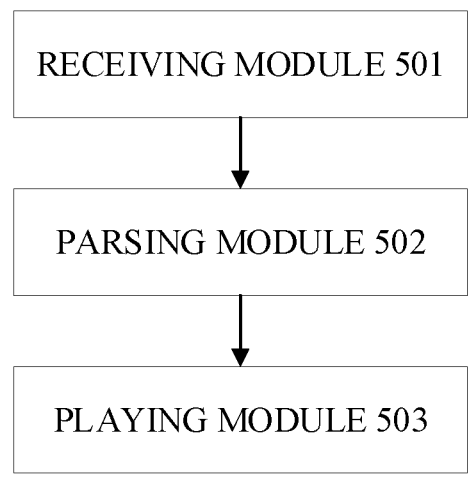
FIG. 5 illustrates a schematic structural diagram of a device of playing audio and video according to some embodiments of the present application.

Based on the method for audio and video playing provided in some embodiments, a device of playing audio and video is provided in some embodiments. Specifically, FIG. 5 illustrates an optional block diagram of the audio and video playing device. The audio and video playing device may be divided into one or more program modules, which are stored in a medium and executable by one or more processors to implement some embodiments of the present application. The program module referred to in some embodiments of the present application refers to a series of computer program instruction segments capable of accomplishing specific functions, and is more suitable, as compared to the program per se, for describing the implementation in the storage medium of the device of playing audio and video. The following description will specifically describe the functions of the program modules according to some embodiments.

As shown in FIG. 5, the audio and video playing device applied to clients includes the following components:

a receiving module 501 for receiving an MPD file in JSON format from a server, where the MPD file in JSON format includes multiple streaming media content segments, each streaming media content segment includes a video segment and/or an audio segment, each of the video segment and the audio segment includes multiple arrays, and each array includes audio parameter information or video parameter information.

According to some embodiments, the audio parameter information includes: bitstream information, audio address information for respective bitstreams, and audio attribute information for respective bitstreams.

The video parameter information includes: resolution information, video address information for respective resolutions, and video attribute information for respective resolutions.

A parsing module 502 is configured to parse the MPD file in JSON format to obtain the audio parameter information and/or the video parameter information.

According to some embodiments, the parsing module 502 is configured to:

parse out streaming media content segments contained in the JSON format MPD file;

parse out video segments and/or audio segments contained in the streaming media content segments;

parse out respective arrays for respective resolutions contained in the video segments, and/or parse out respective arrays for respective bitstreams contained in the audio segments; and parse out video parameter information of a corresponding resolution and/or audio parameter information of a corresponding bitstream contained in the arrays.

A playing module 503 is configured to playing audio and/or video according to the audio parameter information and/or video parameter information.

Figure 6:
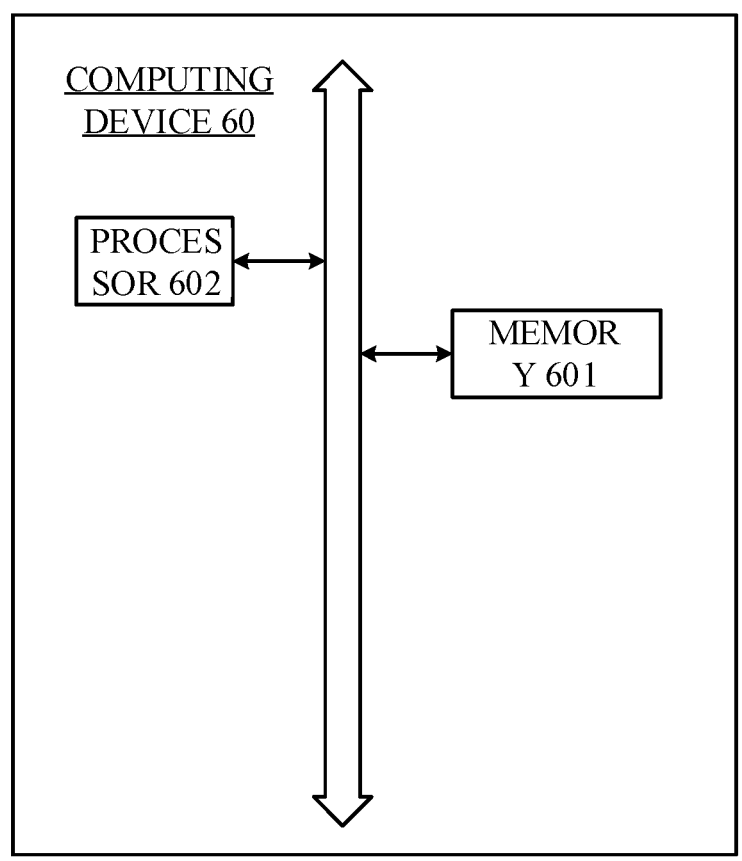
FIG. 6 illustrates a diagram of hardware architecture of a computing device according to some embodiments of the present application.

A computing device is also provided according to some embodiments, which may be a smartphone, a tablet, a laptop, a desktop computer, a rack server, a blade server, a tower server, or a cabinet server (including stand-alone servers, or a cluster of multiple servers), and so on. As shown in FIG. 6, the computing device 60 in some embodiments includes, but is not limited to, a memory 601, a processor 602 that can communicate with each other through a system bus. It is to be noted that FIG. 6 shows only a computing device 60 having components 601-602, but it is understood that it is not required to implement all of the shown components and that more or fewer parts can be implemented in lieu thereof.

In some embodiments, the memory 601 (readable storage medium) includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 601 may be an internal storage cell of the computing device 60 such as a hard disk or memory of the computing device 60. In other embodiments, the memory 601 may also be an external storage device of the computing device 60, such as a plugged hard disk provided on the computing device 60, a smart media card (SMC), secure digital (SD) card, a flash memory card, and the like. Of course, the memory 601 may also include both an internal storage cell and an external storage device of the computing device 60. In some embodiments, the memory 601 is generally used to store an operating system and various types of application software installed in the computing device 60 such as program codes of the audio and video switching device according to some embodiments and the like. In addition, the memory 601 may also be used to temporarily store various types of data that have been or will be outputted.

The processor 602, in some embodiments, may be a central processing unit (CPU), a controller, a microprocessor, or other data processing chip. The processor 602 is generally used to control the overall operation of the computing device 60.

In some embodiments, the processor 602 is used to execute program code for a method of playing audio and video stored in the processor 602, when the program for a method of playing audio and video is executed to implement steps of:

obtaining a streaming media content to be encapsulated, and parsing the streaming media content to obtain audio parameter information and/or video parameter information;

forming a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes the audio parameter information or the video parameter information; and sending the MPD file in JSON format to a client.

The process of the above method steps can be referred to some embodiments, which is not repeatedly described here.

A computing device is also provided, which may be a smartphone, a tablet, a laptop, a desktop computer, a rack server, a blade server, a tower server, or a cabinet server (including stand-alone servers, or a cluster of multiple servers), and so on. As shown in FIG. 6, the computing device 60 in some embodiments includes, but is not limited to, a memory 601 and a processor 602 that can communicate with each other through a system bus. It is to be noted that FIG. 6 shows only a computing device 60 having components 601-602, but it is understood that it is not required to implement all of the shown components and that more or fewer parts can be implemented in lieu thereof.

According to some embodiments, the memory 601 (readable storage medium) includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, magnetic disk, an optical disk, etc. In some embodiments, the memory 601 may be an internal storage module of the computing device 60 such as a hard disk or memory of the computing device 60. In other embodiments, the memory 601 may also be an external storage device of the computing device 60, such as a plugged hard disk, a smart media card (SMC), secure digital (SD) card, a flash memory card, and the like provided on the computing device 60. Of course, the memory 601 may also include both an internal storage module and an external storage device of the computing device 60. In some embodiments, the memory 601 is generally used to store an operating system and various types of application software installed in the computing device 60 such as program codes of the device of playing audio and video according to some embodiments and the like. In addition, the memory 601 may also be used to temporarily store various types of data that have been or will be outputted.

The processor 602, in some embodiments, may be a central processing unit (CPU), a controller, a microprocessor, or other data processing chip. The processor 602 is generally used to control the overall operation of the computing device 60.

In some embodiments, the processor 602 is also used to executing program code for a method of playing audio and video stored in the processor 602, when the program for the method of playing audio and video is executed, the following steps are implemented:

receiving an MPD file in JSON format from a server, where the MPD file in JSON format includes multiple streaming media content segments, each streaming media content segment includes a video segment and/or an audio segment, each of the video segment and the audio segment includes multiple arrays, and each array includes audio parameter information or video parameter information;

parsing the MPD file in JSON format to obtain the audio parameter information and/or the video parameter information; and playing audio and/or video according to the audio parameter information and/or the video parameter information.

The process of the above method steps can be referred to some embodiments, which is not repeatedly described here.

A computer-readable storage medium is also provided, which maybe a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc., which stores computer-readable instructions that upon execution by a processor to implement steps of:

obtaining a streaming media content to be encapsulated, and parsing the streaming media content to obtain audio parameter information and/or video parameter information;

forming a Media Presentation Description (MPD) file in JavaScript Object Notation (JSON) format according to the audio parameter information and/or the video parameter information, where the MPD file in JSON format includes multiple streaming media content segments, each streaming media content segment includes a video segment and/or an audio segment, each of the video segment and the audio segment includes multiple arrays, and each array includes the audio parameter information or the video parameter information; and sending the MPD file in JSON format to a client.

The process of the above method steps can be referred to some embodiments, which is not repeatedly described here.

A computer-readable storage medium is also provided according to some embodiment, which maybe a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc., which stores computer-readable instructions that upon execution by a processor implement steps of:

receiving an MPD file in JSON format from a server, where the MPD file in JSON format includes multiple streaming media content segments, each streaming media content segment includes a video segment and/or an audio segment, each of the video segment and the audio segment includes multiple arrays, and each array includes audio parameter information or video parameter information;

parsing the MPD file in JSON format to obtain the audio parameter information and/or the video parameter information; and playing audio and/or video according to the audio parameter information and/or the video parameter information.

The process of the above method steps can be referred to some embodiment, which is not repeatedly described here.

The method and device of playing audio and video, computing device, and readable storage medium provided by the present application use an MPD file in JSON format to replace a traditional MPD file in XML format. By using the JSON format, the content of the MPD file is more concise and clearer, thereby reducing the volume of the MPD file. In addition, when MPD files in JSON format are encapsulated, different attributes of descriptive audio and video data and descriptive video data can be customized according to needs of a client, and the customized attributes can be added to the MPD file in JSON format.

It should be noted that, in this article, the terms "including", "comprising" or any other variants thereof are intended to cover non-exclusive inclusion, so that a process, method, article or device including a series of elements includes not only those elements, but also includes other elements not explicitly listed, or elements inherent to such a process, method, article, or device. Without more restrictions, an element limited by the sentence "including a . . . " does not exclude that there are other identical elements in the process, method, article, or device that includes the element. As used herein, the term "and/or" includes any and all combinations of one or more of the associated listed items.

The above-mentioned serial numbers of the embodiments of the present application are merely for description, and do not represent the superiority or inferiority of the embodiments.

The embodiments described above are just some embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
obtaining a streaming media content to be encapsulated, and parsing the streaming media content to obtain audio parameter information corresponding to multiple resolutions and/or video parameter information corresponding to multiple bitstreams;
forming a Media Presentation Description (MPD) file in JavaScript Object Notation (JSON) format according to the audio parameter information and/or the video parameter information, wherein the MPD file in JSON format comprises multiple streaming media content segments, each streaming media content segment comprises a video segment and/or an audio segment, each of the video segment and the audio segment comprises multiple arrays, and each array includes corresponding information to a bitstream of the multiple bitstreams in the audio parameter information or corresponding information to a resolution of the multiple resolutions in the video parameter information; and
sending the MPD file in JSON format to a client.

2. The method of claim 1, wherein the audio parameter information comprises bitstream information, audio address information for each of the multiple bitstreams, and audio attribute information for each of the multiple bitstreams; and
wherein the video parameter information comprises resolution information, video address information for each of the multiple resolutions, and video attribute information for each of the multiple resolutions.

3. The method of claim 2, wherein the forming a Media Presentation Description (MPD) file in JavaScript Object Notation (JSON) format according to the audio parameter information and/or the video parameter information comprises:
for a same resolution of the multiple resolutions, adding the corresponding information in the video parameter information to an array of the multiple arrays, and/or for a same bitstream of the multiple bitstreams, adding the corresponding information in the audio parameter information to a respective array;
adding respective arrays for respective resolutions to a video segment, and/or adding respective arrays for respective bitstreams to an audio segment; and
adding the video segment and/or the audio segment to a streaming media content segment.

4. The method of claim 2, wherein the video address information comprises at least one of video primary address information or video backup address information.

5. The method of claim 2, wherein the video attribute information comprises at least one of video stream identification number, bandwidth recommended for video transmission, media type, encoding method, width, height, framerate, video SAR ratio, video SAP start value, whether the video is initialized, current video segment index range, or video encoding identification number.

6. The method of claim 2, wherein the audio address information comprises at least one of audio primary address information or audio backup address information.

7. The method of claim 2, wherein the audio attribute information comprises at least one of audio stream identification number, bandwidth recommended for audio transmission, media type, encoding method, whether the audio is initialized, current audio segment index range, or audio encoding identification number.

8. A computing device, comprising:
one or more processors; and
one or more non-transitory computer-readable storage mediums containing instructions configured to cause the one or more processors to perform operations including:
obtaining a streaming media content to be encapsulated, and parsing the streaming media content to obtain audio parameter information corresponding to multiple resolutions and/or video parameter information corresponding to multiple bitstreams;
forming a Media Presentation Description (MPD) file in JavaScript Object Notation (JSON) format according to the audio parameter information and/or the video parameter information, wherein the MPD file in JSON format comprises multiple streaming media content segments, each streaming media content segment comprises a video segment and/or an audio segment, each of the video segment and the audio segment comprises multiple arrays, and each array includes corresponding information to a bitstream of the multiple bitstreams in the audio parameter information or corresponding information to a resolution of the multiple resolutions in the video parameter information; and
sending the MPD file in JSON format to a client.

9. The computing device of claim 8, wherein the audio parameter information comprises: bitstream information, audio address information for each of the multiple bitstreams, and audio attribute information for each of the multiple bitstreams; and
wherein the video parameter information comprises: resolution information, video address information for each of the multiple resolutions, and video attribute information for each of the multiple resolutions.

10. The computing device of claim 9, wherein the video address information comprises at least one of video primary address information or video backup address information.

11. The computing device of claim 9, wherein the video attribute information comprises at least one of video stream identification number, bandwidth recommended for video transmission, media type, encoding method, width, height, framerate, video SAR ratio, video SAP start value, whether the video is initialized, current video segment index range, or video encoding identification number.

12. The computing device of claim 9, wherein the audio address information comprises at least one of audio primary address information or audio backup address information.

13. The computing device of claim 9, wherein the audio attribute information comprises at least one of audio stream identification number, bandwidth recommended for audio transmission, media type, encoding method, whether the audio is initialized, current audio segment index range, or audio encoding identification number.

14. The computing device of claim 8, wherein the forming a Media Presentation Description (MPD) file in JavaScript Object Notation (JSON) format according to the audio parameter information and/or the video parameter information comprises:
   for a same resolution of the multiple resolutions, adding the corresponding information in the video parameter information for a same resolution to an respective array of the multiple arrays, and/or for a same bitstream of the multiple bitstreams, adding the corresponding information in the audio parameter information for a same bitstream to a respective array;
   adding respective arrays for respective resolutions to a video segment, and/or adding respective arrays for respective bitstreams to an audio segment; and
   adding the video segment and/or the audio segment to a streaming media content segment.

15. A non-transitory computer-program product tangibly embodied in a machine-readable non-transitory storage medium that includes instructions configured to cause one or more processors to:
   obtain a streaming media content to be encapsulated, and parsing the streaming media content to obtain audio parameter information corresponding to multiple resolutions and/or video parameter information corresponding to multiple bitstreams;
   form a Media Presentation Description (MPD) file in JavaScript Object Notation (JSON) format according to the audio parameter information and/or the video parameter information, wherein the MPD file in JSON format comprises multiple streaming media content segments, each streaming media content segment comprises a video segment and/or an audio segment, each of the video segment and the audio segment comprises multiple arrays, and each array includes corresponding information to a bitstream of the multiple bitstreams in audio parameter information corresponding information to a resolution of the multiple resolutions in video parameter information; and
   send the MPD file in JSON format to a client.

16. The non-transitory computer-program product of claim 15, wherein the audio parameter information comprises: bitstream information, audio address information for each of the multiple bitstreams, and audio attribute information for each of the multiple bitstreams; and
   wherein the video parameter information comprises: resolution information, video address information for each of the multiple resolutions, and video attribute information for each of the multiple resolutions.

17. The non-transitory computer-program product of claim 16, wherein the video address information comprises at least one of video primary address information or video backup address information.

18. The non-transitory computer-program product of claim 16, wherein the video attribute information comprises at least one of video stream identification number, bandwidth recommended for video transmission, media type, encoding method, width, height, framerate, video SAR ratio, video SAP start value, whether the video is initialized, current video segment index range, or video encoding identification number.

19. The non-transitory computer-program product of claim 16, wherein the audio attribute information comprises at least one of audio stream identification number, bandwidth recommended for audio transmission, media type, encoding method, whether the audio is initialized, current audio segment index range, or audio encoding identification number.

20. The non-transitory computer-program product of claim 15, wherein the forming a Media Presentation Description (MPD) file in JavaScript Object Notation (JSON) format according to the audio parameter information and/or the video parameter information comprises:
   for a same resolution of the multiple resolutions, adding the corresponding information in the video parameter information to an array of the multiple arrays, and/or for a same bitstream of the multiple bitstreams, adding the corresponding information in the audio parameter information to a respective array;
   adding respective arrays for respective resolutions to a video segment, and/or adding respective arrays for respective bitstreams to an audio segment; and
   adding the video segment and/or the audio segment to a streaming media content segment.

* * * * *